United States Patent
Gielda et al.

(10) Patent No.: US 8,978,308 B2
(45) Date of Patent: Mar. 17, 2015

(54) DOOR STRUCTURE

(75) Inventors: Matthew James Gielda, Peoria, IL (US); Derick Lee Hinderliter, Mapleton, IL (US); Rajesh Mishra, Dunlap, IL (US); Thomas Allan Jenne, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/597,567

(22) Filed: Aug. 29, 2012

(65) Prior Publication Data

US 2014/0062135 A1 Mar. 6, 2014

(51) Int. Cl.
*B60J 5/04* (2006.01)

(52) U.S. Cl.
CPC .................. *B60J 5/0487* (2013.01)
USPC .............................. 49/502; 49/501

(58) Field of Classification Search
CPC ...... B60J 5/0487; B62D 33/0617; E06B 3/26; E02F 9/163; E02F 9/0891
USPC ................ 49/502; 296/146.1, 146.2, 190.11, 296/190.01, 190.06, 190.08; 180/89.12
See application file for complete search history.

(56) References Cited

U.S. PATENT DOCUMENTS

| | | | |
|---|---|---|---|
| 1,663,518 A * | 3/1928 | Ledwinka | 49/166 |
| 4,184,712 A * | 1/1980 | Skahill | 296/190.03 |
| 4,605,259 A * | 8/1986 | Hurlburt | 296/190.08 |
| 4,719,689 A | 1/1988 | Yamamoto et al. | |
| 4,822,098 A * | 4/1989 | Vogt et al. | 296/146.5 |
| 4,916,284 A | 4/1990 | Petrick | |
| 5,016,721 A * | 5/1991 | Yamamoto et al. | 180/89.13 |
| 5,282,661 A * | 2/1994 | Arnberger | 296/190.04 |
| 6,611,990 B1 * | 9/2003 | Sogo et al. | 16/87 R |
| 7,390,049 B2 * | 6/2008 | Nishikawa | 296/146.1 |
| 7,530,623 B2 * | 5/2009 | Hampel | 296/146.11 |
| 7,695,055 B2 * | 4/2010 | Tsukamoto | 296/190.11 |
| 7,866,730 B2 * | 1/2011 | Lewis et al. | 296/146.5 |
| 8,042,859 B2 | 10/2011 | Kimoto | |
| 2009/0064594 A1 | 3/2009 | Kimoto et al. | |
| 2011/0181074 A1 * | 7/2011 | Namura et al. | 296/190.01 |

FOREIGN PATENT DOCUMENTS

| | | | | |
|---|---|---|---|---|
| JP | 05155299 A * | 6/1993 | | B60R 21/11 |
| JP | 2003-220830 A | 8/2003 | | |
| JP | 2004092209 A * | 3/2004 | | E02F 9/16 |

* cited by examiner

*Primary Examiner* — Katherine Mitchell
*Assistant Examiner* — Abe Massad
(74) *Attorney, Agent, or Firm* — Miller, Matthias & Hull LLP (57) ABSTRACT

A door and method for assembling such door for a vehicle are disclosed. The door may comprise a window having a visual surface area and a frame. The frame may include an outer panel surrounding the window and defining a cavity having a draw depth and a mouth, and an inner panel having a first end and a second end. The inner panel may be joined to the outer panel at an inner coupling disposed at the first end and joined to the outer panel at an outer coupling disposed at the second end of the inner panel. The inner panel may substantially cover the mouth of the cavity. The door may have a door area. The visual surface area of the window may be in the range of about 65 percent to 95 percent of the door area.

12 Claims, 6 Drawing Sheets

DOOR STRUCTURE

TECHNICAL FIELD

The present disclosure generally relates to doors of vehicles and, more particularly, relates to doors used on vehicles used in earth moving, construction, material handling, mining applications, and the like.

BACKGROUND

Doors on vehicles are known. Such doors typically have a transparent window portion and a door frame surrounding and supporting the window. The door frame must be strong enough to support the window and to absorb and to dissipate forces on the door. Those forces may be from closing or slamming the door or may be vibrational stresses experienced during operation of the machine or vehicle.

U.S. Pat. No. 8,042,859 ("Kimoto") issued Oct. 25, 2011 is an example of prior art related to doors. FIG. 3 of Kimoto discloses a car door of a vehicle. The car door includes glass windows, and a door frame including an outer panel (not shown) and an inner panel. The larger of the two glass windows may be lowered. The door frame is configured to receive the window when it is lowered. In the disclosure of Kimoto, the window area is a relatively small part of the entire door area. Thus, structural stresses applied to the car door of Kimoto have a relatively large door frame area over which the stresses may be absorbed and/or dissipated. Disadvantageously, the door of Kimoto is not beneficial for use on machines and industrial vehicles because the relatively small window size inhibits the visibility desired by machine and industrial vehicle operators. A better design is needed that provides the desired visibility and the strength to withstand structural loads on the door without adding substantial weight to the vehicle.

SUMMARY OF THE DISCLOSURE

In accordance with one aspect of the disclosure, a door is disclosed. The door may comprise a window, an outer panel surrounding the window, an inner panel having a first end and a second end, the inner panel joined to the outer panel at an inner coupling disposed at the first end and joined to the outer panel at an outer coupling disposed at the second end, and an adhesive disposed between the outer panel and the inner panel at the inner coupling. The outer panel may define a cavity having a draw depth and a mouth. The inner panel may substantially cover the mouth of the cavity. The window may have a visual surface area. The door may have a door area. The visual surface area of the window may be in the range of about 65 percent to 95 percent of the door area.

In accordance with another aspect of the disclosure, a door coupled to a cab frame of a vehicle is disclosed. The door may comprise a window having a visual surface area, an outer panel surrounding the window and defining a cavity having a draw depth and a mouth, and an inner panel having a first end and a second end, the inner panel joined to the outer panel at an inner coupling disposed at the first end and joined to the outer panel at an outer coupling disposed at the second end. The inner panel may substantially cover the mouth of the cavity. The door may have a door area. The visual surface area of the window may be in the range of about 65 percent to 95 percent of the door area.

In accordance with a further aspect of the disclosure, a method of assembling a door for a vehicle is disclosed. The method may comprise aligning and then joining, to form a frame, a portion of the inner panel of the door to the outer panel of the door with an adhesive, and coupling a window to the frame. The outer panel of the door may define a cavity. The inner panel may include a taper disposed in the cavity of the outer panel. The window may having a visual surface area, wherein the visual surface area is in the range of about 65 percent to about 95 percent of the door area.

DETAILED DESCRIPTION

Figure 1:
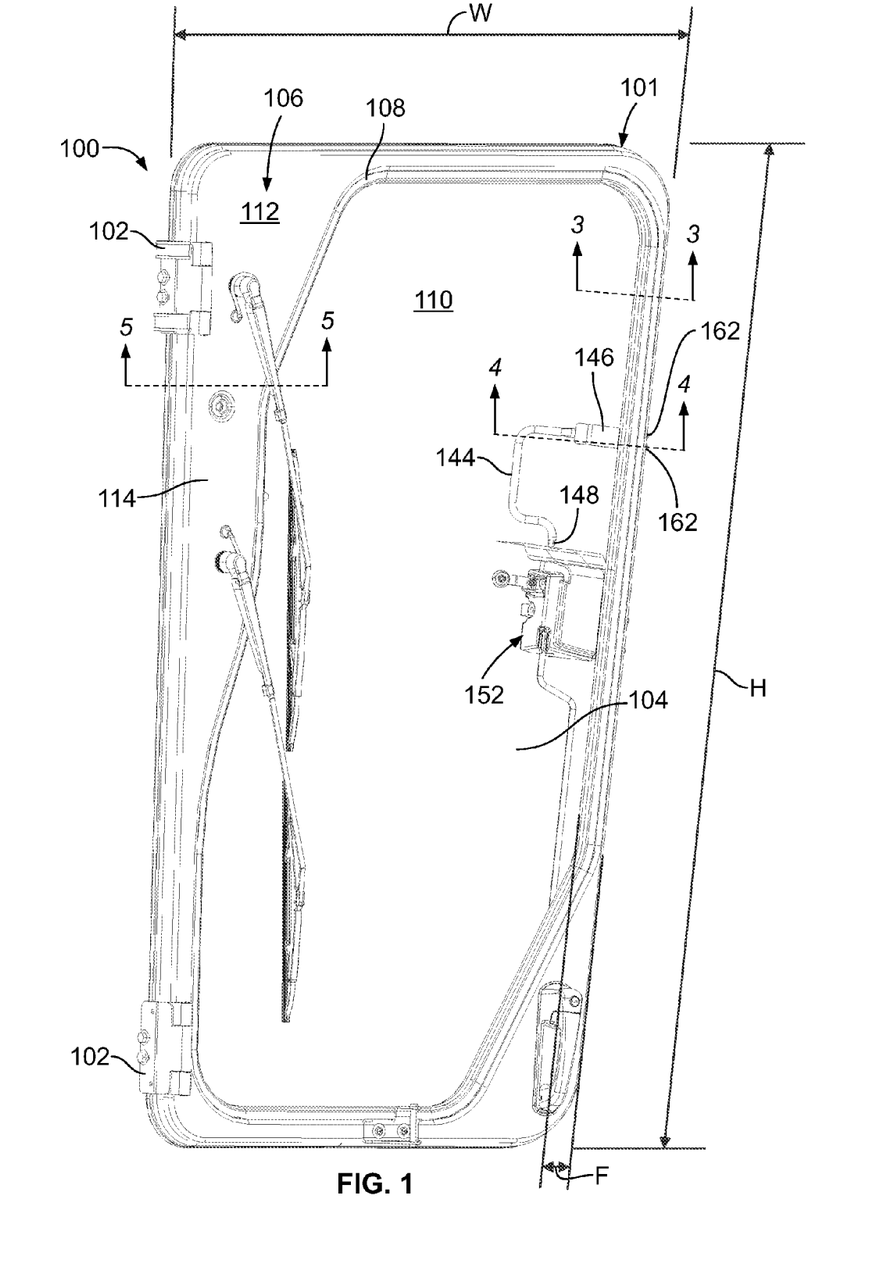
FIG. 1 is a perspective view of the front of one embodiment of a door constructed in accordance with the teachings of this disclosure.
Figure 2:
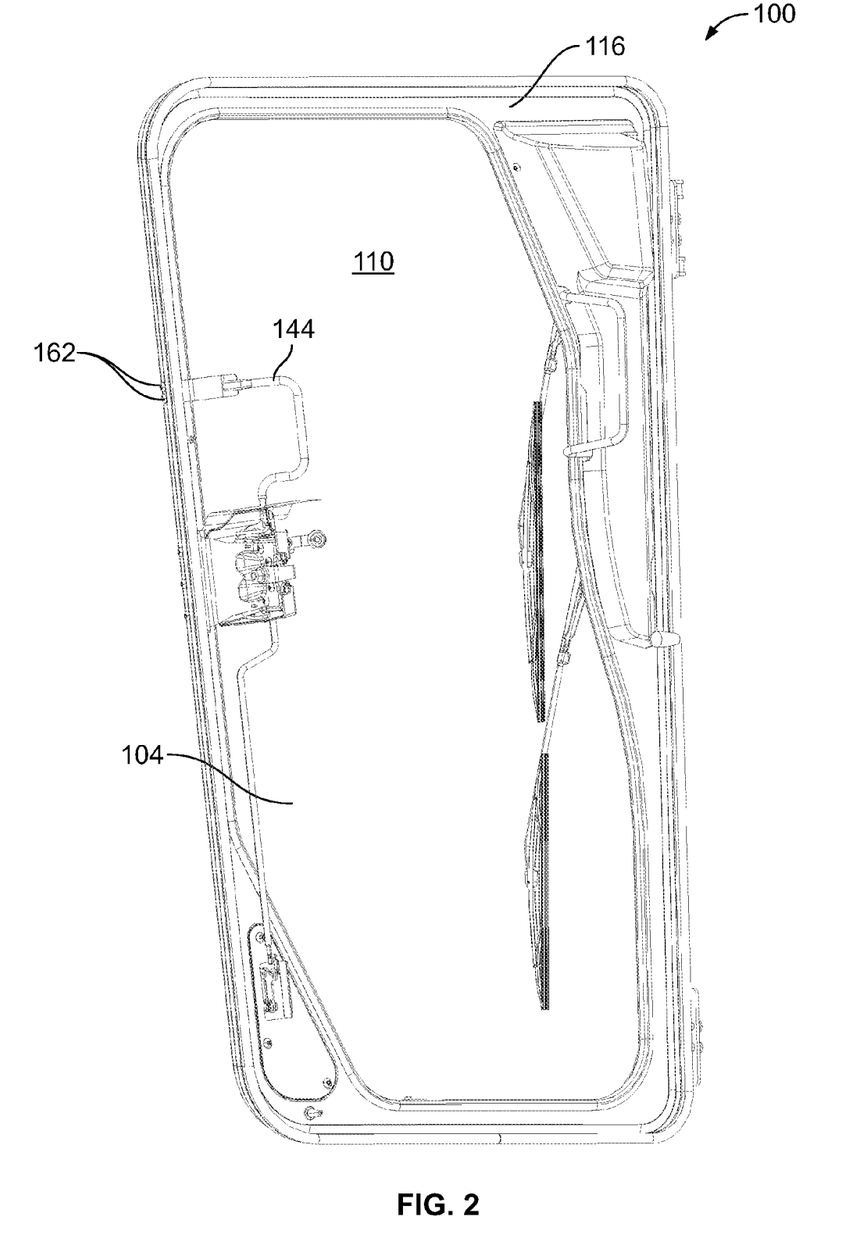
FIG. 2 is a perspective view of the back of the door of FIG. 1.

Referring now to the drawings, and with specific reference to FIGS. 1-2, there are shown perspective views of one embodiment of an exemplary door constructed in accordance with the present disclosure and generally referred to by reference numeral 100. FIG. 1 illustrates a view of the front side of the door 100 and FIG. 2 illustrates the back side of the door 100. While the following detailed description and drawings are made with reference to a door 100 of a motor grader, the teachings of this disclosure may be employed on other earth moving, construction, material handling or mining vehicles in which a door is coupled to the cab frame of such vehicles.

Figure 6:
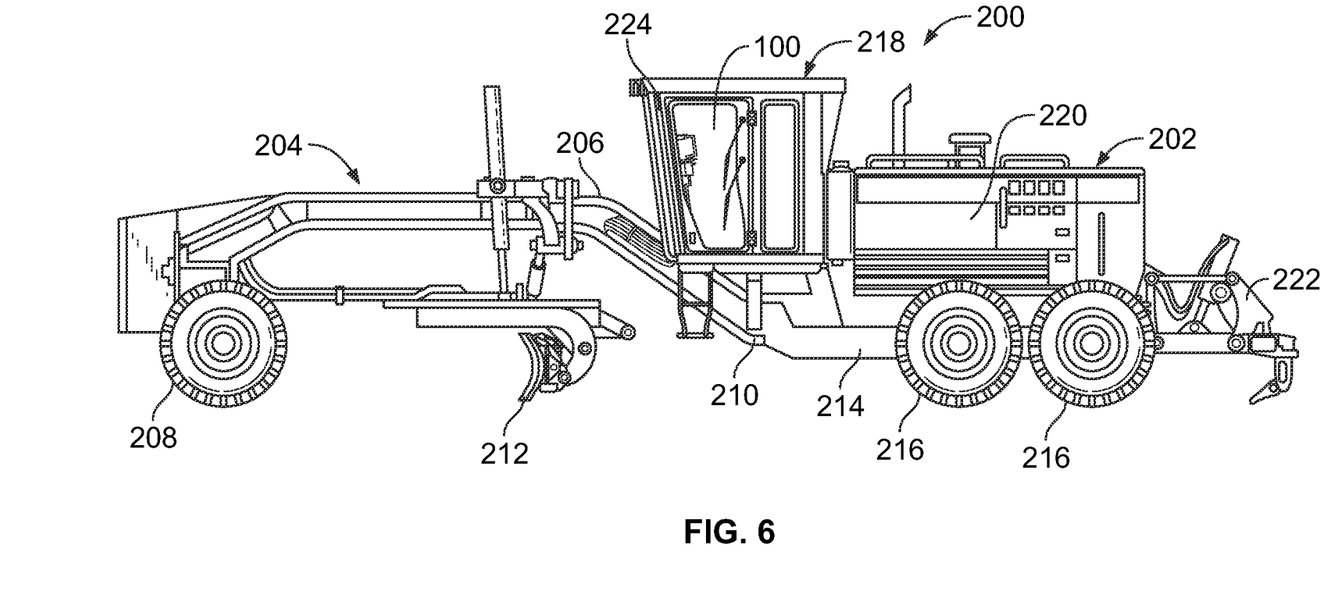
FIG. 6 is a perspective view of a vehicle that incorporates the features of the present disclosure.

FIG. 6 illustrates one example of a vehicle 200 that incorporates the features of the present disclosure. The vehicle in FIG. 6 is a motor grader, although the disclosure is not limited to doors for motor graders. The vehicle 200 includes a rear portion 202 and a front portion 204. The front portion 204 includes a front frame section 206, front ground engaging members 208, an articulated joint 210, and a first implement assembly 212, such as a blade or other appropriate attachment, mounted along the front frame section 206. The front frame section 206 may extend between the articulated joint 210 and the front ground engaging members 208. In some alternative embodiments, the frame 206, 214 may be a single frame piece.

The rear portion 202 includes a rear frame section 214, rear ground engaging members 216, an operator cab assembly 218, an engine 220 and drive train components (not shown). Although the rear ground engaging members 216 may be coupled directly to the rear frame section 214, in the embodiment illustrated in FIG. 6, the rear ground engaging members 216 are rotatably mounted on tandem supports that are pivotably mounted along either side of the rear frame section 214 at pivot shafts. The rear portion 202 may additionally include a second implement assembly 222, such as a ripper assembly, mounted to the rear frame section 214 by an appropriate structure. The cab assembly 218 may include a cab frame 224 and a door 100 coupled to the cab frame 224 by one or more hinges 102 (see FIG. 1) or the like. The cab assembly 218 (FIG. 6) may also include a seat, a steering apparatus, a speed control apparatus and a console (each not shown).

In the embodiment illustrated in FIG. 6, a pair of front ground engaging members 208 are spaced from a plurality of rear ground engaging members 216 which are disposed as pairs along opposite sides of the rear frame section 214. While in the embodiment illustrated in FIG. 6, the ground engaging members 208, 216 are wheels, in other embodiments, the ground engaging members 208, 216 may be track assemblies, or the like. Further, in other embodiments, alternate arrangements of ground engaging members 208, 216 may be utilized. For example, a pair of front wheels and a single pair of rear wheels.

Turning now to FIGS. 1-2, the door 100 may comprise a window 104, a door frame 106 surrounding, or framing, the window 104, and a window gasket 108 that couples the window to the door frame 106. The window 104 may be made of a transparent or translucent material. A portion of the edges of the window 104 may be covered by the window gasket 108.

The area of the window 104 (herein referred to as the "visual surface area" 110 of the window 104) may be about 65% to about 95% of the area of the door 100 (herein referred to as "door area" 112). In some embodiments, the visual surface 110 area may be about 70% to about 90% of the door area 112. In other embodiments, the visual surface area 110 may be about 80% of the door area 112, plus or minus about ten percent. The door area 112 is calculated utilizing the perimeter measurements of the door 100, as is know how to do in the art. The visual surface area 110 is calculated using the perimeter measurements of the window 104 when installed in the door 100. Any portion of the window 104 that is not visible (for example, covered by the window gasket 108) once installed in the door 100, is excluded from the area calculation for the visual surface area 110 of the window 104.

The door 100 may have a wide range of measurements. For example, the height, H, of the door 100 may be in the range of about 1 meter to about 2 meters and the width, W, of the door, at its widest point, may be in the range of about 0.5 meters to about 1.5 meters. Similarly, the width, F, of the frame 106 on each side of the window 104 may also vary. At the narrowest point, the width, F, of the frame 106 may be in the range of about 20 mm to about 50 mm, plus or minus ten percent. In one embodiment, the width F may be in the range of about 24 mm to about 44 mm. In another embodiment the width F may be about 34 mm plus or minus ten percent.

Figure 3:
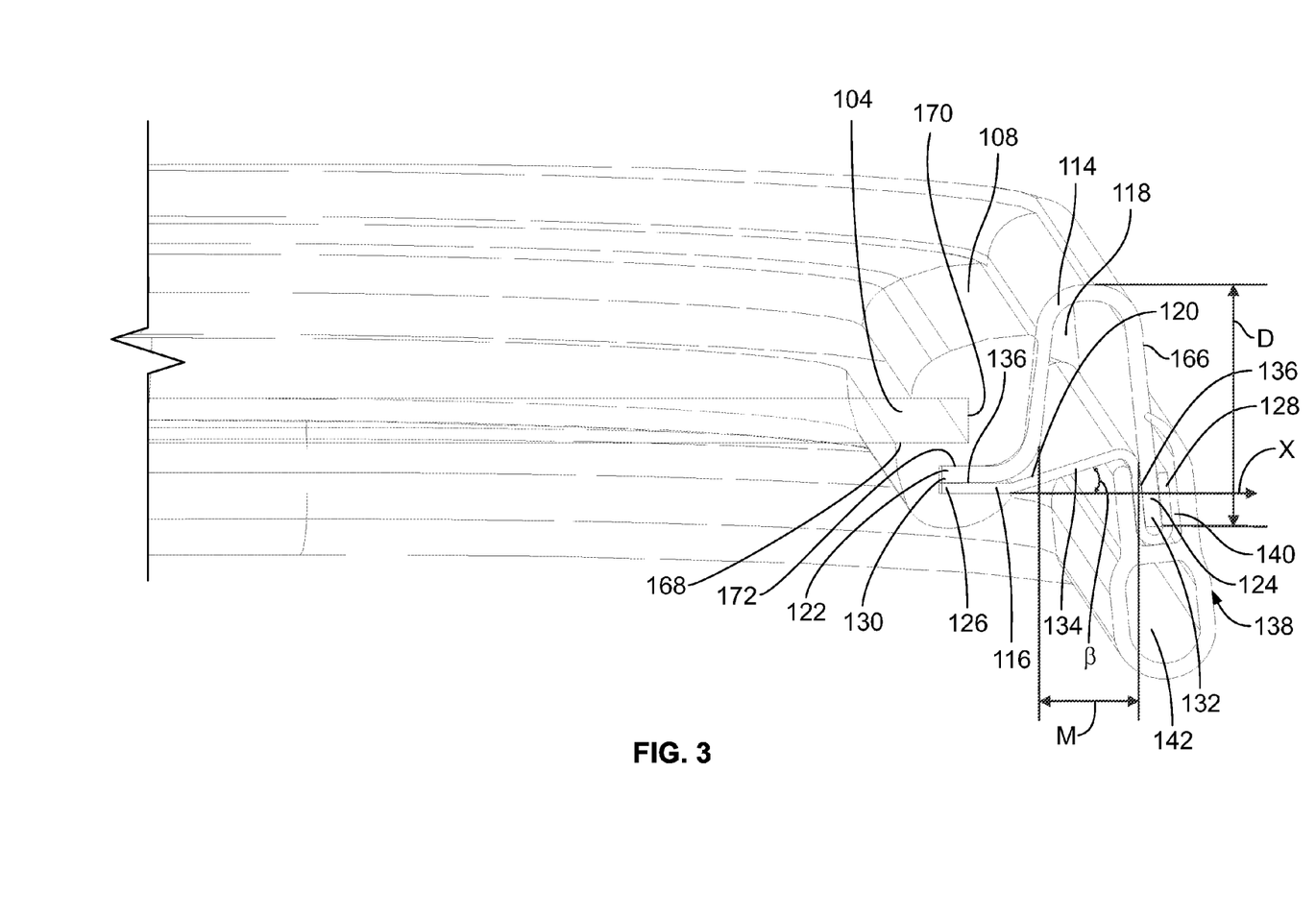
FIG. 3 is a cross-sectional view of the door of FIG. 1 along lines 3-3.

As best illustrated in FIG. 3, the door frame 106 may include an outer panel 114 and an inner panel 116 joined to the outer panel 114. The outer panel 114 may surround the window 104 and, as shown in FIG. 3, may define a cavity 118 having a draw depth D and a mouth 120. The outer panel 114 may extend above the gasket 108 in a direction generally perpendicular to the plane of the window such that a stepped configuration may be generally formed with the gasket 108. The outer panel 114 may also have an inner end 122 and an outer end 124.

The width of the mouth 120, herein referred to as the "mount width", M, may, on some portions of the door frame 106, be relatively narrow. In one embodiment, the mount width, M, may be in the range of about 20 mm to about 75 mm, plus or minus ten percent. In another embodiment, the mount width may be in the range of about 30 mm to about 65 mm. In yet another embodiment the mount width may be about 34 mm plus or minus ten percent. The mount width M may be measured as the distance across the mouth of the cavity formed by the draw depth of the outer panel.

The draw depth D increases the structural integrity of the door frame 106 under stresses such as those generated when an operator, when closing the door 100, slams the door 100 against the cab frame 224. In one embodiment, the draw depth D may range from about 20 mm to about 150 mm on some portions of the door frame 106, plus or minus ten percent. In another embodiment, the draw depth D may range from about 25 mm to about 75 mm on some portions of the frame 106, plus or minus ten percent. In yet another embodiment, the draw depth D may be about 40 mm on some portions of the frame 106, plus or minus ten percent. On some portions of the door frame 106, but not necessarily all portions, the draw depth D in some embodiments may range from about the mount width M to about twice the mount width M.

The inner panel 116 may have a first end 126 and a second end 128. The inner panel 116 may be joined to the outer panel 114 at an inner coupling 130 disposed at the first end 126 of the inner panel 116. The inner panel 116 and the outer panel 114 may be generally flattened in the vicinity of the inner coupling 130. The inner coupling 130 may be disposed on the interior side 168 of the window 104 and may extend beyond the edge 170 of the window 104 to form an overlapping portion 172 encased in the window gasket 108. The inner panel 116 may be joined to the outer panel 114 at an outer coupling 132 disposed at the second end 128 of the inner panel 116. The outer coupling 132 may, in some embodiments, be a hem construction where the inner panel 116 is wrapped around the outer end 124 of the outer panel 114. The outer coupling 132 may be disposed proximal to the exterior 166 of the door 100 and may be generally disposed below the plane of the window 104.

The inner panel 116 may generally cover some or all of the mouth 120 of the cavity 118. The inner panel 116 may include taper 134 disposed in the cavity 118 (of the outer panel 114) at an angle β from an axis X that is generally parallel to the plane of the window 104. The taper 134 increases the structural rigidity of the inner panel 116 when joined to the outer panel 114. In some embodiments, the angle β may be in the range of about 8° to about 55° plus or minus 10 percent. The outer panel 114 and the inner panel 116 may be stamped metal.

The door frame 106 may also include an adhesive 136 disposed between the outer panel 114 and the inner panel 116. In one embodiment, the adhesive 136 is disposed between the outer panel 114 and the inner panel 116 near the inner coupling 130 at the first end 126 of the inner panel 116. In some embodiments, there may also be adhesive 136 disposed between the outer panel 114 and the inner panel 116 near the outer coupling 132 disposed at the second end 128 of the inner panel 116.

The door 100 may also include a door seal 138 surrounding the door frame 106. The door seal 138 may have a pocket 140 and a flexible sealing portion 142. The outer coupling 132 of the door frame 106 may be disposed in a nesting arrangement in the pocket 140 of the door seal 138. When the door 100 is coupled to the cab frame 224 and the door 100 is shut, the door seal 138 may be in sealing engagement with the cab frame 224 against which it is received. The door 100 may be pivotably coupled to the cab frame 224 by hinges 102 (FIG. 1), or the like, mounted to the door frame 106 and the cab frame 224 (FIG. 6).

Figure 4:
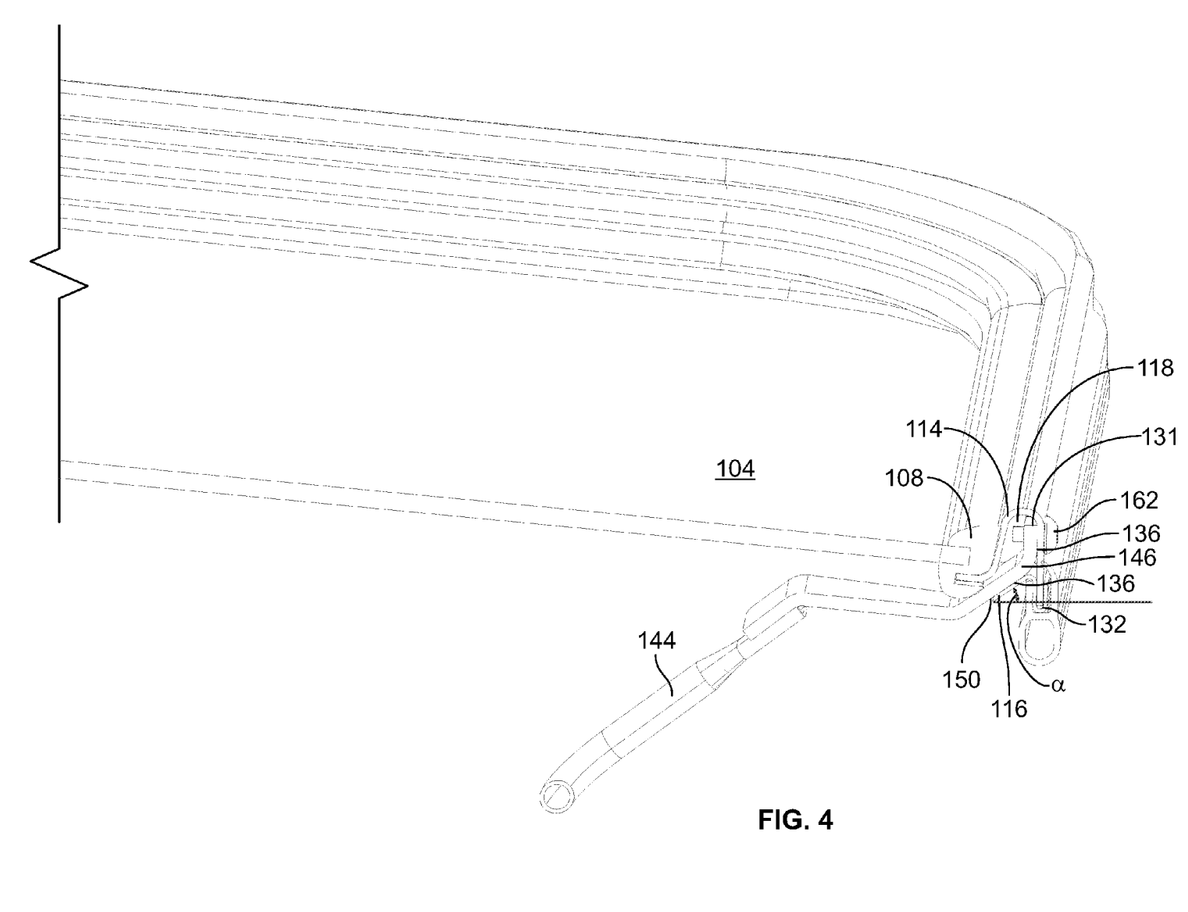
FIG. 4 is a cross-sectional front view of the door of FIG. 1 along lines 4-4.

The door 100 may also include a door handle 144 (FIG. 1). The door handle 144 may have an upper door handle end 146 and a lower door handle end 148. The upper end 146 of the door handle 144 may be coupled to the outer panel 114. As best seen in FIG. 4, the upper end of the door handle 144 may extend through an aperture 150 in the inner panel 116 into the cavity 118 of the outer panel 114. In one embodiment, the upper end 146 of the door handle 144 may be secured to the outer panel 114 by one or more attachment members 162, for example bolts, or the like. In one embodiment, a pair of attachment members may be used as best seen in FIGS. 1-2. In other embodiments, other types of securing structure, as is known in the art, may be used to join the upper end 146 of the door handle 144 to the outer panel 114. An adhesive 136 may be disposed between the door handle 144 and the inner panel 116. An adhesive 136 may also be disposed between the door handle 144 and the inner sidewall 131 of the cavity 118. In some embodiments, the lower end 148 of the door handle 144 may be coupled to a latch apparatus 152 (FIG. 2) mounted on the outer panel 114. Due to the securing of the door handle to the outer panel (FIG. 4), the angle of the taper may change to an angle α that may be different than the previously described angle β. In some embodiments, the angle α may be in the range of about 10° to about 45°, plus or minus 10 percent.

Figure 5:
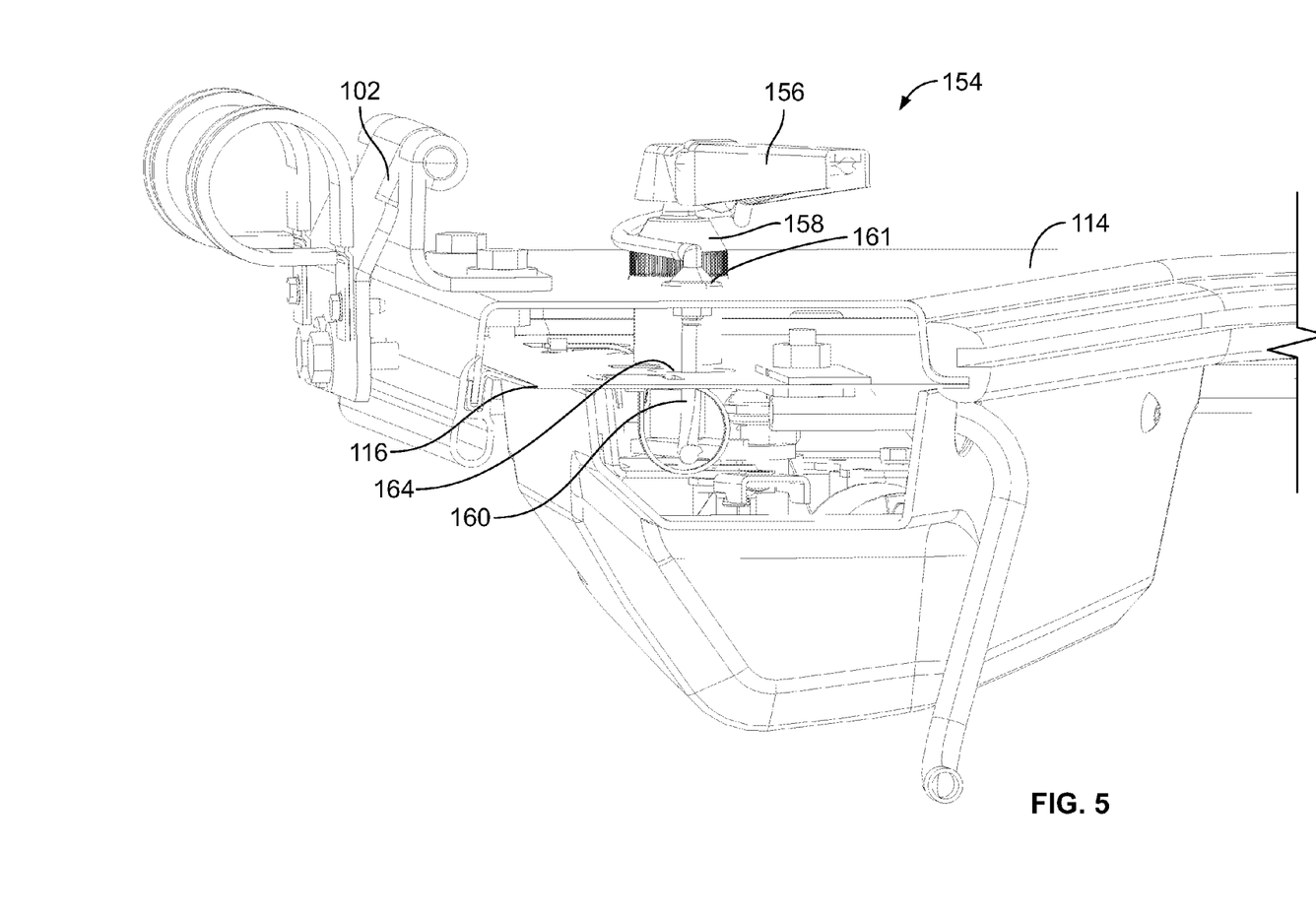
FIG. 5 is a cross-sectional view of the door of FIG. 1 along lines 5-5.

In some embodiments, the door 100 may also include one or more wiper assemblies 154 (FIG. 1) mounted on the door 100. FIG. 5 illustrates a cross-sectional view of a wiper assembly 154 mounted on the door 100 near the hinge 102. The wiper assembly 154 may include a wiper head 156, a neck 158 and a body 160. The wiper head 156 may be mounted to the neck 158 which may be mounted to the body 160. The neck 158 may extend through a wiper aperture 161 in the outer panel 114. The body 160 may extend through a body aperture 164 in the inner panel 116.

Also disclosed is a method for method of assembling the door 100. The method comprises aligning and then joining to form the door frame 106 a portion of the inner panel 116 of the door 100 to the outer panel 114 with an adhesive 136. When joined the taper 134 may be disposed in the cavity 118 of the outer panel 114. The method may also include coupling the window 104 to the door frame 106.

Industrial Applicability

The present disclosure may find applicability in providing a vehicle door that can support a relatively large window while providing the structural integrity needed to absorb and to dissipate forces on the door. Those forces may be from closing or slamming the door or may be vibrational stresses experienced during operation of the machine or vehicle. The features disclosed herein may be particularly beneficial to motor graders, wheel loaders and other earth moving, construction, mining or material handling vehicles that doors with relatively large windows.

What is claimed is:

1. A door having a door area, the door coupled to a cab frame of a vehicle, the cab frame and the door defining an interior space, the door comprising:
    a window having a visual surface area;
    a door frame including an outer panel and an inner panel relative to the interior space defined by the cab frame and the door, the outer and inner panels surrounding the window, the inner panel disposed between the interior space and the outer panel;
    the outer panel having an inner end and an outer end relative to the window, the outer panel extending in a direction generally perpendicular to a plane of the window and defining a cavity having a draw depth and a mouth having a mount width; and
    the inner panel having a first end and a second end, the first end of the inner panel joined to the inner end of the outer panel at an inner coupling and the second end joined to the outer end of the outer panel at an outer coupling forming a hem construction, the inner panel substantially covering the mouth of the cavity, the inner panel including a taper disposed at an angle from a window axis within the cavity, the window axis generally parallel to a plane of the window, wherein the inner and outer couplings are both disposed on a first side of the plane of the window, wherein further a portion of the cavity defined by the outer panel is substantially disposed on a second side of the plane of the window, the second side different from the first side and disposed exterior to the cab frame and the door and the interior space, the inner panel being located substantially on the first side of the plane of the window, the cavity oriented to extend in a generally perpendicular direction away from the plane of the window toward outside of the vehicle, wherein the visual surface area is in the range of about 65 percent to 95 percent of the door area.

2. The door of claim 1, further comprising an adhesive disposed between the outer panel and the inner panel at the inner coupling.

3. The door of claim 1, wherein the angle is in the range of about 10° to about 45°.

4. The door of claim 1, further comprising a door seal disposed over the outer coupling.

5. The door of claim 1, further comprising a window gasket disposed over at least a portion of the inner coupling.

6. The door of claim 1, further comprising a door handle joined to the outer panel inside the cavity, wherein the inner panel defines an aperture through which the door handle extends.

7. The door of claim 1, further comprising a wiper assembly, wherein the inner panel defines a first wiper aperture and the outer panel defines a second wiper aperture, wherein the wiper assembly extends through the first and second wiper apertures.

8. The door of claim 1, further comprising an adhesive disposed between the outer panel and the inner panel at the outer coupling.

9. A door having a door area, the door coupled to a cab frame of a vehicle, the cab frame and the door defining an interior space, the door comprising:
    a window having a visual surface area;
    a door frame including an outer panel and an inner panel relative to the interior space defined by the cab frame and the door, the outer and inner panels surrounding the window, the inner panel disposed between the interior space and the outer panel;
    the outer panel having an inner end and an outer end relative to the window, the outer panel extending in a direction generally perpendicular to a plane of the window and defining a cavity having a draw depth and a mouth having a mount width;
    the inner panel having a first end and a second end, the first end of the inner panel joined to the inner end of the outer panel at an inner coupling forming a flattened configuration and the second end joined to the outer end of the outer panel at an outer coupling forming a hem construction, the inner panel substantially covering the mouth of the cavity, wherein the inner coupling is disposed along an interior side of the window and extending parallel to the plane of the window beyond a window edge to form an overlapping portion, the inner panel including a taper disposed at an angle from a window axis within the cavity, the window axis generally parallel to a plane of the window, wherein the inner and outer couplings are both disposed on a first side of the plane of the window, wherein further a portion of the cavity defined by the outer panel is substantially disposed on a second side of the plane of the window, the second side different from the first side and disposed exterior to the cab frame and the door and the interior space, the inner panel being located substantially on the first side of the plane of the window, the cavity oriented to extend in a generally perpendicular direction away from the plane of the window toward outside of the vehicle, wherein the draw depth on a portion of the outer panel is in the range of about the mount width to about twice the mount width.

10. The door of claim 9, wherein the visual surface area is in the range of about 65 percent to 95 percent of the door area.

11. The door of claim 9, further including a gasket coupling the door frame with the window; the gasket having a portion covering a portion of an edge of the window and another portion encasing the overlapping portion of the inner coupling.

12. The door of claim 11, wherein the outer panel extends above the gasket in a direction generally perpendicular to the plane of the window such that a stepped configuration may be generally formed with the gasket.

\* \* \* \* \*

UNITED STATES PATENT AND TRADEMARK OFFICE
CERTIFICATE OF CORRECTION

| | | |
|---|---|---|
| PATENT NO. | : 8,978,308 B2 | Page 1 of 1 |
| APPLICATION NO. | : 13/597567 | |
| DATED | : March 17, 2015 | |
| INVENTOR(S) | : Gielda et al. | |

It is certified that error appears in the above-identified patent and that said Letters Patent is hereby corrected as shown below:

In the Specification

Column 5, line 32, delete "Industrial Applicability" and insert -- INDUSTRIAL APPLICABILITY --.

Signed and Sealed this
Nineteenth Day of July, 2016

Michelle K. Lee
*Director of the United States Patent and Trademark Office*